Feb. 17, 1970  R. P. HAMLEN ET AL  3,496,018
TERMINAL AND CURRENT COLLECTOR FOR COMPACTED
POWDER ELECTRODE CELLS
Filed April 8, 1966

Inventors:
Robert P. Hamlen,
Erwin G. Siwek,
by Carl O. Thomas
Their Attorney.

United States Patent Office 3,496,018
Patented Feb. 17, 1970

3,496,018
TERMINAL AND CURRENT COLLECTOR FOR COMPACTED POWDER ELECTRODE CELLS
Robert P. Hamlen, Scotia, and Erwin G. Siwek, Ballston Spa, N.Y., assignors to General Electric Company, a corporation of New York
Filed Apr. 8, 1966, Ser. No. 541,329
Int. Cl. H01m 35/00, 13/10
U.S. Cl. 136—6      10 Claims

ABSTRACT OF THE DISCLOSURE

An electrode assembly has a conductive sheet with a plurality of projections on one surface and a plurality of folds having troughs on the other surface. A compacted powder electrode is interlocked with the projections on one surface while a terminal strip is fitted into a trough on the opposite surface. A cell is described which includes such an electrode assembly.

---

The invention relates to a novel terminal and current collector arrangement having utility with compacted powder electrodes and cells including such electrodes.

The art has long been recognized that compacted powder electrodes pose difficulties in obtaining efficient and durable electrical contact therewith. Merely pressing a layer of conducting material adjacent the electrode has not produced satisfactory results, since compacted powder electrodes tend to change dimensions in use.

To counter the inefficiencies of pressing a current collector against a powdered electrode, numerous complex and intricately shaped current collectors have been proposed for use with powdered electrodes. For the most part these current collectors have been expensive to construct and have required expensive dies especially constructed for conformation therewith to compact the powder forming the chemically active portion of the electrode. Many of the current collectors conventionally employed, particularly where the electrodes are to be employed in cells having insulative housings, have suffered the further disadvantage of having protruding terminal tabs integrally formed, thereby adding to the complexity and expense of the pressing die configuration. In a number of cells having insulative housings separate elements and manufacturing steps are required to achieve an efficient electrical contact between the current collector and cell terminal.

It is an object of our invention to provide a novel terminal strip and current collector arrangement for compacted electrodes which provides an efficient electrical connection at relatively low cost.

It is another object to provide a low cost, efficient cell including a compacted powder electrode, current collector, and terminal strip constructed according to our invention.

These and other objects of our invention are accomplished by providing a current collector including a conductive sheet having first and second opposed major faces and forming a plurality of folds having troughs opening from the first face and forming projections extending toward the second face. A compacted powder electrode means is provided which includes a portion interlocked with the projections adjacent the second face. A terminal strip is fitted into the trough of at least one fold in the current collector.

Figure 1:
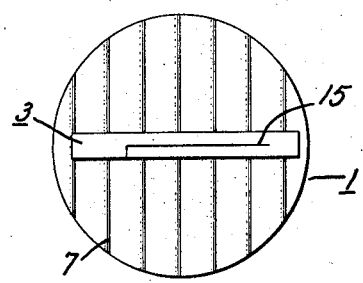
Figure 2:
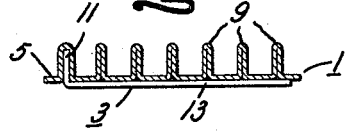
Figure 3:
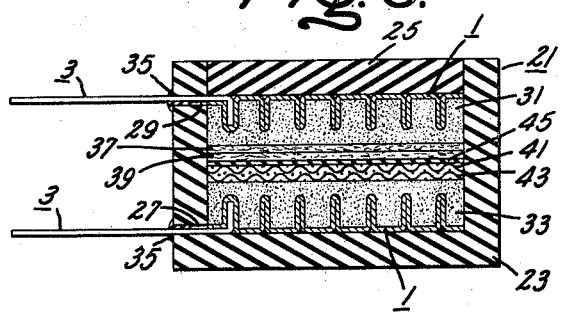

Our invention may be better understood by reference to the following detailed description considered in conjunction with the drawings, in which FIGURE 1 is an elevation of a current collector and terminal strip formed according to our invention, FIGURE 2 is a vertical section of the current collector showing the terminal strip attached, and FIGURE 3 is a vertical section of a specific, preferred cell configuration.

FIGURES 1 and 2 illustrate a sub-assembly formed of the current collector 1 and the terminal strip 3. The current collector is shown formed of a sheet 5 of electrically conductive material. While any conventional electrically conductive material inert to alkaline electrolytes may be used, it is preferred to employ a thin gauge metal or metal foil. The sheet is provided with a plurality of folds forming a plurality of closed troughs 7 opening from one major surface and a plurality of projections 9 extending toward the remaining major surface of the sheet.

The terminal strip is shown with one end portion 11 inserted in the trough of a fold to form a secure electrical contact with the current collector. In most instances, a frictional fit between the current collector fold and the end portion of the terminal strip provides an acceptable electrical contact. If desired, however, the end portion may be positively connected to the sheet as by crimping, soldering, riveting, adhesively bonding, etc.

The portion 13 of the terminal strip is initially mounted adjacent the trough opening surface of the current collector sheet. It is noted that the terminal strip initially lies entirely within the periphery of the current collector. This means that the terminal strip and current collector may be placed in a die of simple configuration for uniting a powder electrode thereto. As shown, the current collector exhibits a circular periphery, meansing that the assembly could be mounted in the bottom of a standard cylindrical die cavity for uniting with the powder electrode, rather than requiring an expensive, especially constructed mold cavity, as is frequently required with conventional current collectors.

After a powder electrode has been united to the assembly, the terminal strip may be folded so that it extends beyond the periphery of the current collector and electrode. Thus, where a cell having an insulating housing is employed, the terminal strip may provide a direct connection between the interior and exterior of the cell. It is preferred that the terminal strip be formed of flexible material so that it can be folded out. This is not, however, required. The terminal strip may be alternatively taken out of the trough after uniting of the electrode, rotated 180 degrees, and reinserted. This technique is applicable, of course, only to those instances where a press fit between the current collector and terminal strip is relied upon, and this technique is not preferred, since the electrical contact may be damaged by removal and reinsertion of the terminal strip.

In certain instances it may be desired that the terminal strip extend farther beyond the current collector than can be accomplished merely by folding the terminal strip outwardly. This may occur, for example, where the cell is small compared to the thickness of the cell wall. As shown in FIGURE 1 the terminal strip is provided with a slot 15. This allows the terminal strip to be folded out to a length exceeding the diameter of the current collector.

A variety of powdered electrodes are known to the art which may be employed in combination with our current collector and terminal strip sub-assembly. Widely used suitable powdered electrodes include silver, mercury, zinc, cadmium, nickel, and manganese dioxide in particulate form as the chemically active material. While the electrodes are conventionally referred to as silver electrodes, mercury electrodes, zinc electrodes, etc., depending on the predominant reaction material present, the metals may be present in the form of an oxide or hydroxide, subject to the charge state. Additionally, minor amounts of other metals may be alloyed with the predominant metal.

Note, for example, that zinc electrodes usually contain from 5 to 15 percent by weight mercury. The electrodes may also contain conductive fillers. For example, graphite may be employed in combination with mercury, cadmium, nickel, and manganese dioxide electrodes, whereas silver, copper, and gold are usable in combination with powdered electrodes of the type listed above with the exception of zinc electrodes. To insure cohesion the electrodes may optionally include up to 30 percent by volume, preferably no more than 5 percent by volume, of an adhesive such as a natural or synthetic resin, hydrocarbon residue, etc. Most commonly used binders are synthetic resins such as polyvinyl acetate, polytetrafluoroethylene, polyethylene, and polyvinyl alcohol.

To illustrate the applicability of our invention to cells having powdered electrodes, a specific preferred cell embodiment 21 is shown in FIGURE 3. The cell is comprised of an insulative housing formed of a lower cup-shaped housing portion 23 and an upper, closure housing portion 25. The lower housing portion includes spaced apertures 27 and 29. Mounted within the housing are spaced electrodes 31 and 33 each united to a current collector 1 of the type illustrated in FIGURES 1 and 2. The terminal strip 3 associated with each current collector is folded outwardly and passes through the adjacent housing aperture. To seal between the terminal strips and the cell housing a small quantity of adhesive 35 is shown applied to the upper and lower apertures. We have found epoxy resins loaded with inert, non-conductive inorganic fillers, such as clay, which are commercially available to be excellently suited for this purpose where alkaline electrolytes are employed in the cell.

A free aqueous alkaline electrolyte may be employed in the cell shown. It is conventional practice to hold the electrolyte immobilized in a capillary matrix which also functions as a separator for the cell. Any conventional matrix or separator material may be employed in our cells. The separator combination shown in FIGURE 3 has been found to be particularly useful where the electrode 31 is a zinc electrode and the electrode 33 is a silver electrode. Two layers 37 and 39 of a felted fiber inert to alkaline electrolyte, such as polypropylene felt, are shown positioned adjacent the zinc electrode. Adjacent the silver electrode are located two layers 41 and 43 of an inert fabric supported membrane of controlled pore size. An exemplary suitable fabric supported vinyl acrylic membrane is marketed by Gelman Instrument Company under the trademark "Acropor." Separating the felted and fabric sheets is a layer of cellophane 45, which acts as a barrier, allowing electrolyte passage but blocking the migration of solids. This reduces any tendency for the zinc electrode material to migrate to the silver electrode.

As may be readily appreciated the cell shown in FIGURE 3 can be fabricated at low cost. The electrodes may be formed in standard, low cost cylindrical dies as previously described. The terminal strip associated with the electrode 33 is folded out and passed through aperture 27. The separator layers with electrolyte held by capillary action therein are then superimposed and the electrode 31 placed thereover. The adhesive 35 used to close the apertures may be easily applied. Thereafter the housing portion 25 may be attached. In the specific cell structure shown the upper housing portion is formed by casting an epoxy layer over the upper electrode after the cell has been otherwise assembled.

While we have disclosed our invention with reference to certain preferred embodiments, as required by law, it is appreciated that numerous modifications may be made without departing from the scope of our invention. For example, while the current collector is shown formed of a plurality of parallel folds, it is not necessary that the folds be either parallel or evenly spaced. Further, multiple folds may be formed which intersect. Also, it is not necessary that the fold troughs be closed as shown. The structural arrangement previously illustrated and described, however, is preferred for its economy of manufacture. Whether the current collector folds are initially open or closed, they will be closed after the electrode has been united thereto.

The cell structure shown in FIGURE 3 is merely illustrative of a specific cell structure which we have built and have found to be advantageous. Numerous modifications are readily suggested. It is appreciated that cells formed according to our invention need only employ one compacted powder electrode formed according to our teaching, rather than two as shown and described. While our electrode construction has particular utility with cells having insulative housings, the construction may be employed with cells having conductive housings. The particular combination of separator shown in FIGURE 3 is not essential to cells constructed according to our invention, including cells having zinc and silver electrodes. The particular adhesive seal between the cell housing and the terminal strips, while preferred, is not essential. In certain applications it may be desirable to leave one or more apertures open to the interior of the cell for purposes of venting or to provide a separate vent.

In view of the foregoing it is intended that the scope of our invention be determined with reference to the following claims.

What we claim as new and desire to secure by Letters Patent of the United States is:

1. The combination comprising:
   a current collector including a conductive sheet having first and second opposed major faces and forming a plurality of folds having troughs opening from said first face and forming projections extending toward said second face,
   compacted powder electrode means including a compacted powder portion interlocking with said projections adjacent said second face, and
   a terminal strip fitted into said trough of at least one said fold of said current collector.

2. The combination according to claim 1, in which said folds in said current collector are arranged in substantially evenly spaced parallel rows.

3. The combination according to claim 1, in which said folds are formed with closed troughs.

4. The combination according to claim 1, in which said terminal strip is formed of flexible, readily foldable material.

5. The combination according to claim 1, in which said terminal strip is initially folded to lie within the periphery of said current collector and includes foldout means integrally formed therewith allowing said terminal strip to be extended to a length exceeding the width of said current collector.

6. A cell comprising:
   a housing formed of electrically insulative material,
   a first electrode assembly mounted within said housing comprising:
      a current collector including a conductive sheet having first and second opposed major faces and forming a plurality of folds having troughs opening from said first face and forming projections extending toward said second face,
      compacted powder electrode means including a compacted powder portion interlocking with said projections adjacent said second face, and
      a terminal strip fitted into said trough of at least one said fold of said current collector,
   a second electrode assembly mounted within said housing spaced from said first electrode assembly, and
   electrolyte means extending between said first and second electrode assemblies.

7. A sealed cell comprising:
   a housing having first and second apertures therein and formed of an electrically insulative material,
   a first electrode assembly mounted within said housing comprising:

a current collector including a conductive sheet having first and second opposed major faces and forming a plurality of folds having troughs opening from said first face and forming projections extending toward said second face, compacted powder electrode means including a compacted powder portion interlocking with said projections adjacent said second face, and a first terminal strip fitted into said trough of at least one fold of said current collector and extending through said first aperture in said housing, a second electrode assembly mounted within said housing spaced from said first electrode assembly, said second electrode assembly including a second terminal strip extending through said second aperture, electrolyte means extending between said first and second electrode assemblies, and means sealing between said housing and said first and second terminal strips.

8. The combination according to claim 7, in which said sealing means is an epoxy resin loaded with an inert non-conductive inorganic filler.

9. A sealed silver-zinc cell comprising:

a housing having first and second apertures therein and formed of an electrically insulative material, a silver electrode assembly mounted within said housing comprising:

- a current collector including a conductive sheet having first and second opposed major faces and forming a plurality of folds having troughs opening from said first face and forming projections extending toward said second face,
- compacted silver powder electrode means including a compacted powder portion interlocking with said projections adjacent said second face, and
- a first terminal strip fitted into said trough of at least one fold of said current collector and extending through said first aperture in said housing, a zinc electrode assembly mounted within said housing spaced from said silver electrode assembly comprising:

- a current collector including a conductive sheet having first and second opposed major faces and forming a plurality of folds having troughs opening from said first face and forming projections extending toward said second face, and
- a second terminal strip fitted into said trough of at least one fold of said current collector and extending through said second aperture in said housing, electrolyte means extending between said first and second electrode assemblies including means separating said compacted electrode means and preventing migration of zinc from said zinc electrode assembly to said silver electrode assembly, and means sealing between said housing and said first and second terminal strips.

10. A sealed silver-zinc cell according to claim 9, in which said electrolyte means is comprised of at least one felted layer adjacent said zinc electrode assembly, at least one porous fabric layer adjacent said silver electrode, and a cellophane barrier interposed between said felted and fabric layers.

References Cited

UNITED STATES PATENTS

| | | | |
|---|---|---|---|
| 276,348 | 4/1883 | Brush | 136—45 |
| 2,968,686 | 1/1961 | Duddy | 136—6 |
| 3,049,578 | 8/1962 | Jonsson et al. | 136—30 |
| 3,237,060 | 2/1966 | Ross | 136—133 XR |
| 3,264,140 | 8/1966 | Gohle | 136—81 |
| 3,305,400 | 2/1967 | Barber et al. | 136—120 |
| 3,333,986 | 8/1967 | Chreitzberg et al. | 136—6 |
| 3,340,099 | 9/1967 | Sherfey | 136—133 |
| 3,353,998 | 11/1967 | Langguth et al. | 136—6 |

WINSTON A. DOUGLAS, Primary Examiner

A. SKAPARS, Assistant Examiner

U.S. Cl. X.R.

136—45, 102, 120, 135